United States Patent
Sodo

(10) Patent No.: US 7,839,251 B2
(45) Date of Patent: Nov. 23, 2010

(54) FILTERING CHOKE ARRANGEMENT FOR A FREQUENCY CONVERTER

(75) Inventor: Nicklas Sodo, Vaasa (FI)

(73) Assignee: Vacon Oyj, Vaasa (FI)

( * ) Notice: Subject to any disclaimer, the term of this patent is extended or adjusted under 35 U.S.C. 154(b) by 156 days.

(21) Appl. No.: 11/907,912

(22) Filed: Oct. 18, 2007

(65) Prior Publication Data

US 2008/0094159 A1     Apr. 24, 2008

(30) Foreign Application Priority Data

Oct. 20, 2006  (FI) .................................. 20060925

(51) Int. Cl.
- H01F 27/28 (2006.01)
- H01F 27/34 (2006.01)
- H01F 17/04 (2006.01)

(52) U.S. Cl. ....................... 336/180; 336/181; 336/182; 336/184; 336/220; 336/221

(58) Field of Classification Search ................. 336/173, 336/180–184, 214–215, 220–222
See application file for complete search history.

(56) References Cited

U.S. PATENT DOCUMENTS

| | | | |
|---|---|---|---|
| 1,791,719 A * | 2/1931 | Eiseman ..................... | 336/160 |
| 5,581,224 A * | 12/1996 | Yamaguchi ................. | 336/212 |
| 5,731,666 A | 3/1998 | Folker et al. | |
| 5,747,981 A | 5/1998 | Callanan | |
| 5,905,642 A | 5/1999 | Hammond | |
| 6,867,564 B1 * | 3/2005 | Wu et al. ..................... | 318/448 |
| 6,987,372 B1 | 1/2006 | Wu et al. | |
| 2003/0206087 A1 * | 11/2003 | Raff ............................. | 336/182 |

FOREIGN PATENT DOCUMENTS

| | | |
|---|---|---|
| DE | 29616712 U1 | 12/1996 |
| JP | 2-91905 A | 3/1990 |
| JP | 2006-319176 A | 11/2006 |
| JP | 2007-48897 A | 2/2007 |
| WO | WO-94/10749 A1 | 5/1994 |

\* cited by examiner

*Primary Examiner*—Elvin G Enad
*Assistant Examiner*—Ronald W Hinson
(74) *Attorney, Agent, or Firm*—Birch, Stewart, Kolasch & Birch, LLP

(57) ABSTRACT

Three-phase AC or two-phase DC choke arrangement of a frequency converter, in which is a magnetic core, in which are the phase-specific pillars of the AC choke arrangement or the branch-specific pillars of the DC choke arrangement (1*a*, 1*b*), around which are arranged the phase-specific windings of the AC choke arrangement or the branch-specific windings of the DC choke arrangement (Ldc1+, Ldc1−) to filter difference-mode currents, and in which an additional pillar (3) for damping common-mode currents is arranged in the magnetic core of the choke. The additional pillar (3) is arranged without the phase-specific or branch-specific windings fitted around it, in which case damping of the common-mode currents is achieved by means of the common-mode impedance formed by the windings arranged around the additional pillar and around the phase-specific or the branch-specific pillars.

19 Claims, 2 Drawing Sheets

FILTERING CHOKE ARRANGEMENT FOR A FREQUENCY CONVERTER

This Nonprovisional application claims priority under 35 U.S.C. §119(a) on Patent Application No(s). 20060925 filed in Finland on Oct. 20, 2006, the entire contents of which are hereby incorporated by reference.

FIELD OF TECHNOLOGY

The object of this invention is a filtering choke arrangement for a frequency converter.

It is general in frequency converters to use a filtering choke to limit the harmonics of the network current. The choke can be disposed either between the connection point of the 3-phase supply network and the rectifying bridge (Lac, FIG. 1) or between the rectifying bridge and the smoothing capacitor of the DC intermediate circuit (Ldc, FIG. 1).

PRIOR ART

Figure 2:
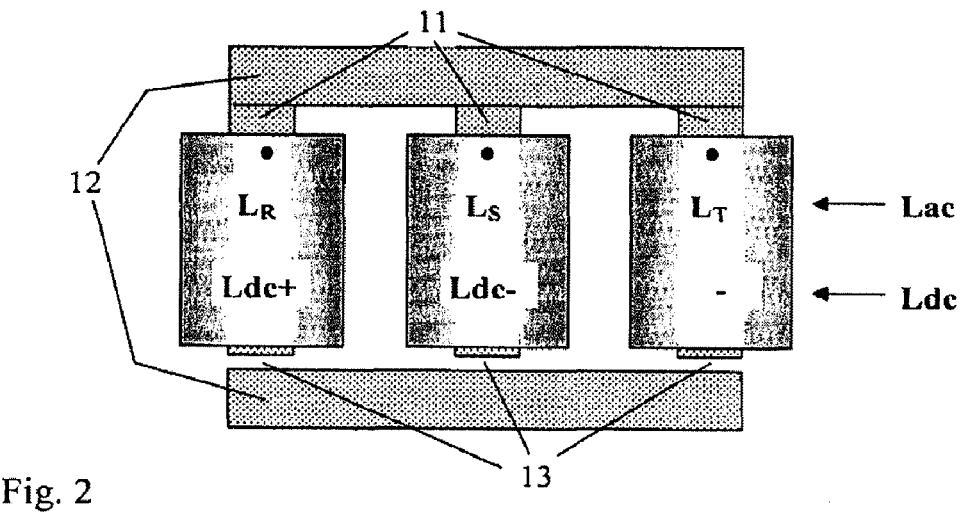

The conventional AC choke solution generally used can as is known be comprised of three separate single-phase chokes or it can be a three-pillar solution assembled in the same packet as shown in FIG. 2 Three different chokes are more expensive in terms of costs than a three-pillar choke, as a result of which this kind of solution is rarer. An equivalent conventional DC choke solution is otherwise similar but it has one pillar less and correspondingly only two windings. For cost reasons it is general to use also only a single-winding DC choke (either Ldc+ or Ldc−).

With conventional chokes according to FIG. 2 the common-mode impedance is small, because the common-mode magnetic flux does not have a pathway via the core. That being the case this most general conventional solution dampens common-mode currents badly.

Publication U.S. Pat. No. 6,987,372 discloses a DC choke solution in which an extra pillar and branch-specific windings around it are arranged in the magnetic core. Thus a large common-mode impedance is achieved which is comparably well suited to damping common-mode currents.

SUMMARY OF THE INVENTION

The object of this invention is the kind of filtering choke solution, a special feature of which is a high impedance that limits common-mode currents, and also as an additional feature a capability of indicating a line-to-earth short-circuit by means of an additional winding. In addition the construction principle of the choke makes it possible to set the magnitudes of the common-mode impedances separately independently with respect to the other.

An additional pillar is arranged in the magnetic core of the choke in the solution according to the invention as a pathway for the magnetic flux produced by the common-mode currents. Owing to the windings disposed around the additional pillar and around the other phase-specific pillars, sufficient common-mode impedance for damping the common-mode currents is obtained in the choke according to the invention.

In the choke according to the invention the impedances filtering the difference-mode currents are formed in the same way as in a conventional solution owing to the pillar and the winding disposed around it. The impedance damping the common-mode currents is formed from the same windings and from the magnetic circuit of the additional pillar. The impedances of the difference-mode and common-mode choke parts are determined on the basis of the number of turns in the winding, the surface areas of the parts of the magnetic core and the air gaps between them so that via the dimensions of these parts the magnitudes of the difference-mode and common-mode impedances can be set within certain limits to those desired independently of each other. Since the magnitude of the common-mode current is normally substantially smaller than the magnitude of the difference-mode current, the additional pillar can be dimensioned purely on the basis of the common-mode current, in which case its cross-section area is smaller than the cross-section area of the other pillars. It is also possible to use a different material in the additional pillar than in the other parts of the magnetic core, in which case the magnetic core of the additional pillar can e.g. be optimized to dampen high-frequency common-mode currents particularly well.

According to one preferred embodiment according to the invention the additional pillar does not have any air gap at all. With this kind of DC choke solution the transformer effect between Ldc+ and Ldc− of the windings is very small, which reduces the voltage stress to which the network bridge is subjected in a line-to-earth short-circuit situation of the motor circuit, when the neutral point of the supply network is earthed.

According to another preferred embodiment according to the invention a winding is installed around the additional pillar, which functions as a sensitive indicator of line-to-earth short-circuit.

The magnetic cores of the choke can be manufactured from plate parts by stamping and stacking the parts manufactured this way one on top of the other in the same manner as is done in the manufacture of electric motors. It is also possible to use other prior-art solutions, e.g. powder cores and ferrite cores which are better suited than iron plate to damping high-frequency common-mode currents.

The windings of straight pillar parts can be wound around separate coil formers which are then installed as prefabricated windings into their position around the pillars. When the pillar is arch-shaped its windings can be manufactured e.g. from toroidal transformers and toroidal chokes with technology that is prior art.

The characteristic features of the solution according to the invention are described in detail in claim 1, and the characteristic features of its preferred embodiments in the other claims.

The choke solution according to the invention is best suited to applications in which limiting common-mode currents is very important, e.g. in conjunction with frequency converters connected in parallel as well as in networks in which sensitive line-to-earth short-circuit monitors are used. The AC choke version can also be used in LCL filters of frequency converters that brake to the network or it can be connected between a frequency converter and a motor, in which case the common-mode impedance limits earth currents that stress the bearings of the motor.

SHORT DESCRIPTION OF THE DRAWINGS

Figure 1:
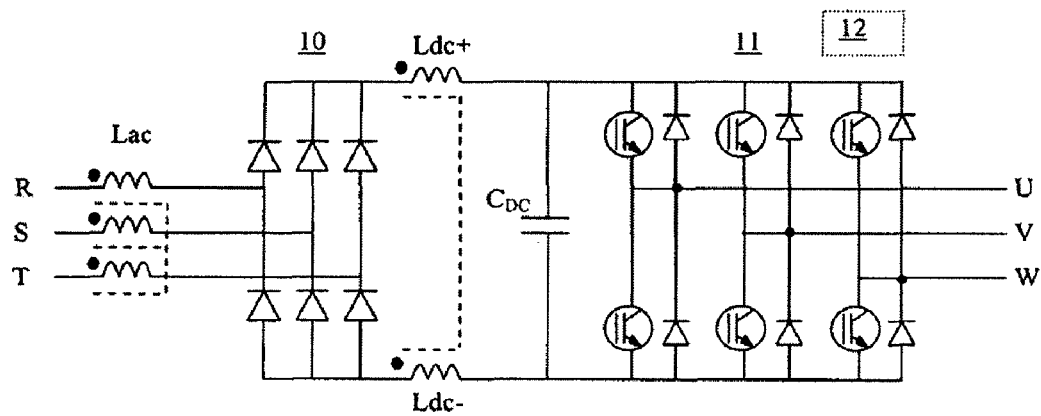
Figure 3:
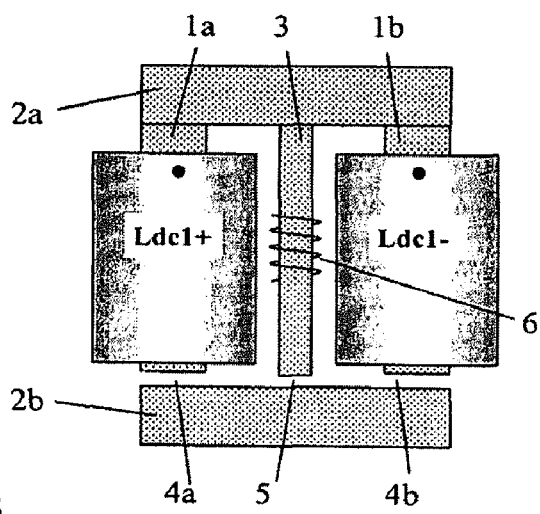
Figure 4A:
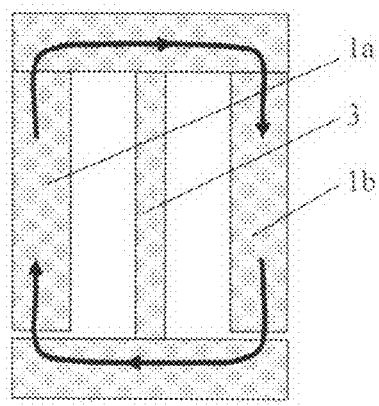
Figure 4B:
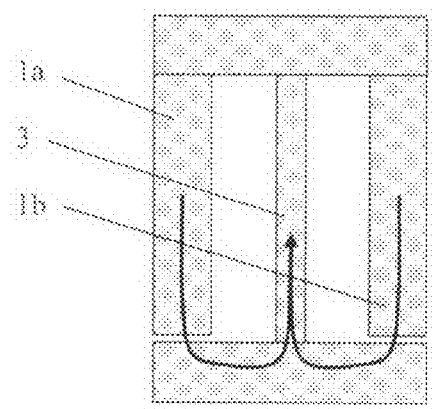
Figure 5A:
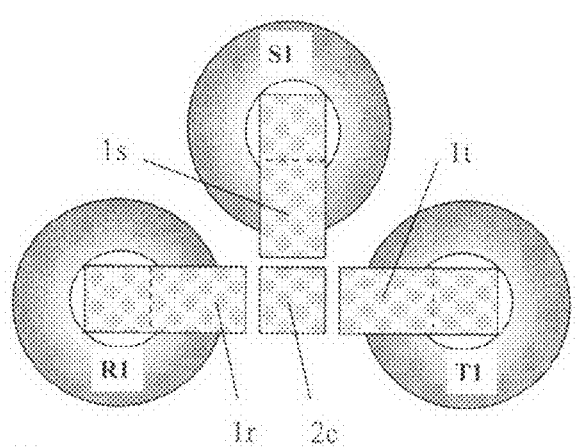
Figure 5B:
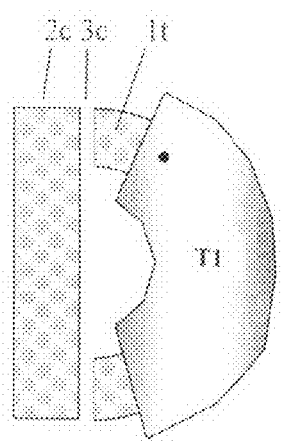
Figure 6A:
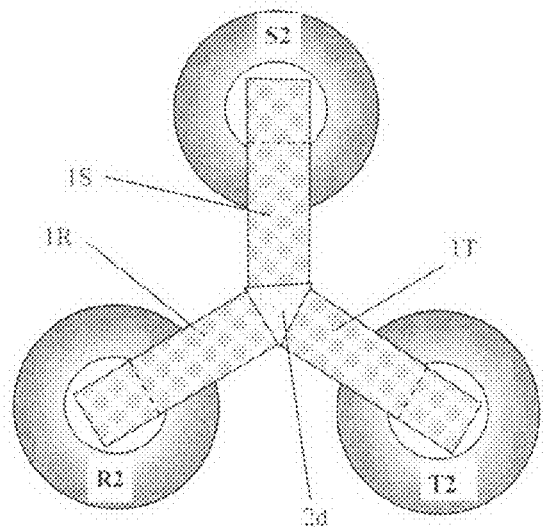
Figure 6B:
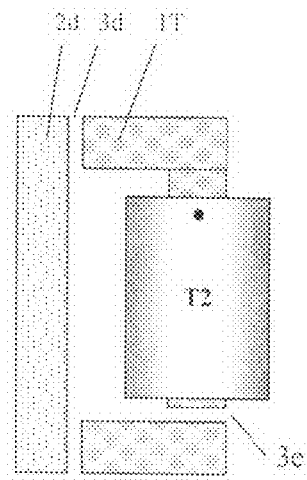

In the following, the invention will be described in more detail by the aid some embodiments with reference to the attached drawings, wherein FIG. 1 presents the main circuit of a frequency converter FIG. 2 presents a conventional three-pillar AC choke solution or a conventional two-pillar DC choke solution, FIG. 3 presents a DC choke solution according to the invention FIGS. 4a and 4b present the pathways of magnetic flux with a difference-mode current and a common-mode current in a DC choke solution according to the invention FIGS. 5a and 5b present an AC choke solution according to the invention FIGS. 6a and 6b present another AC choke solution according to the invention.

DETAILED DESCRIPTION OF THE INVENTION

FIG. 1 presents the main circuit of a normal three-phase PWM frequency converter, in which is a network bridge 10 comprised of diodes for rectifying the three-phase alternating voltage of the supply network, a filtering capacitor $C_{DC}$, a load bridge 11 comprised of three phase switches implemented with power semiconductors, which forms the three-phase output voltage U, V, W from the DC voltage of the intermediate circuit, and a control unit 12. The figure also presents both alternative choke solutions Lac and Ldc generally used to filter the harmonics of the network current. The winding direction of the phase windings of the choke is marked with small dots next to the choke. A general DC choke solution is also one in which only a single branch-specific choke (Ldc+ or Ldc−) is used.

FIG. 2 presents the construction of a typical conventional choke. In the AC choke the Lac magnetic core comprises three pillars 11 and yokes 12 connecting the ends of the pillars. There is also an air gap 13 in the magnetic circuit, with which the desired inductance value and current limit at which the magnetic core starts to saturate is set. The phase-specific windings $L_R$, $L_S$, $L_T$ are wound in the same direction around the pillars. An equivalent conventional DC choke solution is otherwise similar but it has one pillar less and correspondingly only two windings Ldc+ and Ldc− or only one winding, e.g. Ldc+.

In a frequency converter application the load current flows as is known most of the time via only two phases (difference-mode current), in which case in this choke solution also the magnetic flux flows correspondingly mainly via only two pillars at a time. High-frequency common-mode current, i.e. current flowing in the same direction via the poles of all the input phases or of both poles of the DC intermediate circuit, normally causes the common effect of rapid switching phenomena of the load bridge and distributed capacitances of the motor circuit. This kind of current causes flux in the same direction in each pillar of the magnetic core of the choke, and the magnetic flux caused by which has no return route along the core material, as a result of which the common-mode inductance is in this kind of choke solution is very small.

When using a DC choke with both a single-branch (Ldc+ or Ldc−) and a double-branch (Ldc+ and Ldc−) solution, the same filtering effect of the harmonics of the network current is achieved, as is known. The double-branch solution is indeed used mainly to limit current in a line-to-earth short-circuit situation of the motor circuit, because in this kind of situation the current typically flows only via one of the branches. When the magnetic core of the windings of this kind of choke is shared according to the example in FIG. 2, the windings have a strong magnetic connection to each other (transformer effect), as a result of which in a line-to-earth short-circuit situation the voltage formed over the first winding is induced also over the second winding. This induced voltage increases the voltage stress to which the network bridge 10 is subjected. In a solution of two completely separate DC chokes, this kind of surplus voltage stress does not occur.

FIG. 3 presents an example of a preferred DC choke solution according to the invention, the magnetic core of which contains an additional pillar 3 in addition to the normal pillars 1a, 1b and the windings Ldc1+, Ldc1− around them. In addition the magnetic core comprises yokes 2a, 2b that connect the pillars. The air gap 5 of the additional pillar can be of a different size to the air gap 4a, 4b of the other pillars or it can be absent altogether.

According to one preferred embodiment according to the invention the additional pillar does not have an air gap and a winding 6 is disposed around it to detect a line-to-earth short-circuit situation. In a line-to-earth short-circuit the current flows typically via only one of the windings Ldc1+, Ldc1− in which case the flux of the magnetic core correspondingly flows via only the pillar corresponding to the winding and the additional pillar. Since the power switches of the load bridge of the frequency converter are known to be capable of disconnecting their currents very quickly, typically in less than 10 μs, it is possible to disconnect a line-to-earth short-circuit current detected by means of this kind of additional winding already at a very low current level, e.g. below 5% of the rated current of the device. The dimensioning of the cross-section area of the additional pillar is based on the maximum value of the flux flowing through it, so that in this kind of situation in which the line-to-earth short-circuit current is disconnected at the level of 5% of the rated current of the device, also the cross-section area of the additional pillar can likewise be on the scale of 5% of the cross-section area of the edge pillars. Since a pulse at the control signal level is sufficient for detecting a line-to-earth short-circuit situation, the winding 6 can be low-current (a thinner conductor than in the edge windings) and smaller in terms of the number of turns, e.g. 1/100 of the number of turns of the edge windings.

FIGS. 4a and 4b illustrate the passage of the magnetic flux caused by the difference-mode and the common-mode current in an embodiment of a choke according to FIG. 3. In the case of the difference-mode current presented in FIG. 4a, the magnetic flows caused by the windings Ldc1+ and Ldc1− are in different directions (because in the intermediate circuit the currents of the DC+ branch and the DC− branch are in different directions) thereby amplifying each other. In this kind of fully symmetrical situation the flux does not flow via the additional pillar at all, in which case no voltage signal is induced in the winding 6 possibly disposed around it. In the case of the common-mode current presented in FIG. 4b, the magnetic flows caused by the windings Ldc1+ and Ldc1− are in the same direction, in which case the magnetic fluxes caused by them become summed and pass via the additional pillar, in which case a voltage signal is induced in the winding 6 possibly disposed around it.

In a line-to-earth short-circuit situation, in which current flows via only one winding (the situation is not separately presented in the figure), a pathway is found for the flux induced by the current-carrying winding of the first edge pillar, so that the flux of the second edge pillar, and also the voltage induced through it over the winding disposed on the second edge pillar, remain very small. With the choke according to the invention the same effect is thus achieved in this situation as with two completely separate chokes, but the new solution is significantly less expensive because the quantity of material needed in the magnetic core is less.

FIGS. 5a and 5b present an embodiment of a symmetrical implementation of a three-phase AC choke according to the invention. Here the phase-specific branches are formed of the semicircular magnetic cores 1r, 1s, 1t according to FIG. 5b and the windings R1, S1, T1 disposed around them. The phase-specific branches are disposed around the additional pillar 2c at 90° intervals according to FIG. 5a. The air gap 3c of the magnetic circuit can be situated e.g. according to FIG. 5b between the additional pillar and the phase-specific branches. An induction winding of line-to-earth short-circuit can be disposed around the additional pillar, with which the situation is detected in the same manner as in the case of a DC choke.

FIGS. 6a and 6b present another embodiment of an implementation of a three-phase AC choke according to the invention. Here the phase-specific branches are formed of the rectangular pillar parts 1R, 1S, 1T of the magnetic core that are positioned symmetrically at 120° intervals according to FIG. 6b, around which the windings R2, S2, T2 are disposed. The additional pillar 2d is in this embodiment triangular, in which case the phase-specific branches can be disposed around it symmetrically according to FIG. 6a.

It is obvious to the person skilled in the art that the different embodiments of the invention are not limited solely to the example described above, but that they may be varied within the scope of the claims presented below.

The invention claimed is:

1. Three-phase AC or two-phase DC choke arrangement of a frequency converter, comprising:
    a magnetic core with a plurality of phase specific pillars having phase specific windings wound there around or a plurality of branch specific pillars having branch specific windings wound therearound,
    wherein, the phase-specific windings of the AC choke arrangement or the branch-specific windings of the DC choke arrangement are adapted to filter difference-mode currents, and
    in which an additional pillar for damping common-mode currents is arranged in the magnetic core,
    characterized in that,
    the additional pillar is arranged without the phase-specific or branch-specific windings fitted around it, and is adapted to damp common-mode currents by means of a common-mode impedance formed by the additional pillar and the windings arranged around the phase-specific or branch-specific pillars, and
    a winding is arranged around the additional pillar and is adapted to form a small-signal level pulse in a line-to-earth short-circuit situation.

2. Choke arrangement according to claim 1, characterized in that the magnetic core further comprises a yoke and the additional pillar is arranged with respect to the yoke without an air gap therebetween.

3. Choke arrangement according to claim 1, characterized in that the additional pillar is a different material than the other pillars.

4. Choke arrangement according to claim 1, characterized in that the cross-section area of the winding wire of the winding of the additional pillar is smaller than the cross-section area of the windings of the other pillars.

5. Choke arrangement according to claim 1, characterized in that the number of turns of the winding of the additional pillar is smaller than number of turns of the windings of the other pillars.

6. Choke arrangement according to claim 1, characterized in that the cross-section area of the additional pillar of the magnetic core of the choke is smaller than the surface area of the other pillars.

7. Choke arrangement of a three-phase AC choke according to claim 1, characterized in that the phase-specific branches are formed from semicircular-shaped magnetic cores, around which are arranged windings.

8. Choke arrangement of a three-phase AC choke according to claim 1, characterized in that the phase-specific branches are formed from rectangular pillar parts of the magnetic core, around which are arranged windings.

9. Choke arrangement of a three-phase AC choke according to claim 1, characterized in that the additional pillar is rectangular in its cross-section.

10. Choke arrangement of a three-phase AC choke according to claim 9, characterized in that the phase-specific branches are arranged at 90° intervals around the additional pillar.

11. Choke arrangement of a three-phase AC choke according to claim 1, characterized in that the additional pillar is triangular in its cross-section, and the phase-specific branches are disposed around it symmetrically at 120° intervals.

12. Choke arrangement according to claim 2, characterized in that around the additional pillar is a winding, which forms a small-signal level pulse in a line-to-earth short-circuit situation.

13. Choke arrangement according to claim 3, characterized in that around the additional pillar is a winding, which forms a small-signal level pulse in a line-to-earth short-circuit situation.

14. Choke arrangement according to claim 4, characterized in that the number of turns of the winding of the additional pillar is smaller than number of turns of the windings of the other pillars.

15. Choke arrangement of a three-phase AC choke according to claim 2, characterized in that the phase-specific branches are formed from rectangular pillar parts of the magnetic core, around which are arranged windings.

16. Choke arrangement of a three-phase AC choke according to claim 3, characterized in that the phase-specific branches are formed from rectangular pillar parts of the magnetic core, around which are arranged windings.

17. Choke arrangement of a three-phase AC choke according to claim 1, characterized in that the phase-specific branches are formed from rectangular pillar parts of the magnetic core, around which are arranged windings.

18. Choke arrangement of a three-phase AC choke according to claim 4, characterized in that the phase-specific branches are formed from rectangular pillar parts of the magnetic core, around which are arranged windings.

19. Choke arrangement of a three-phase AC choke according to claim 5, characterized in that the phase-specific branches are formed from rectangular pillar parts of the magnetic core, around which are arranged windings.

* * * * *